United States Patent
Yamada

(10) Patent No.: US 9,405,492 B2
(45) Date of Patent: Aug. 2, 2016

(54) NON-TRANSITORY STORAGE MEDIUM STORING INSTRUCTIONS, INFORMATION PROCESSING DEVICE, IMAGE PROCESSING APPARATUS, AND IMAGE PROCESSING SYSTEM

(71) Applicant: Brother Kogyo Kabushiki Kaisha, Nagoya-shi, Aichi-ken (JP)

(72) Inventor: Jun Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/288,892

(22) Filed: May 28, 2014

(65) Prior Publication Data

US 2014/0355035 A1    Dec. 4, 2014

(30) Foreign Application Priority Data

May 28, 2013    (JP) .................................. 2013-111418

(51) Int. Cl.
*G06K 15/00*    (2006.01)
*G06F 3/12*    (2006.01)

(52) U.S. Cl.
CPC ............ *G06F 3/1238* (2013.01); *G06F 3/1203* (2013.01); *G06F 3/1222* (2013.01); *G06F 3/1231* (2013.01); *G06F 3/1288* (2013.01); *G06F 3/1289* (2013.01); *G06F 3/1292* (2013.01)

(58) Field of Classification Search
None
See application file for complete search history.

(56) References Cited

U.S. PATENT DOCUMENTS

| | | | | |
|---|---|---|---|---|
| 8,474,023 | B2 * | 6/2013 | Verma et al. | 726/6 |
| 2007/0266320 | A1 * | 11/2007 | Adams et al. | 715/700 |
| 2008/0094657 | A1 * | 4/2008 | Ikegami et al. | 358/1.15 |
| 2008/0134295 | A1 * | 6/2008 | Bailey et al. | 726/4 |
| 2009/0300740 | A1 * | 12/2009 | Verma | H04L 63/062 726/6 |
| 2010/0153506 | A1 * | 6/2010 | Lim | 709/206 |
| 2011/0051186 | A1 * | 3/2011 | Katsuda et al. | 358/1.15 |
| 2012/0229838 | A1 * | 9/2012 | Mogaki | G06F 21/608 358/1.14 |

FOREIGN PATENT DOCUMENTS

JP    2012-194773 A    10/2012

* cited by examiner

*Primary Examiner* — John Wallace
(74) *Attorney, Agent, or Firm* — Banner & Witcoff, Ltd.

(57) ABSTRACT

A non-transitory storage medium stores instructions which, when executed by a processor of an information processing device, cause the processor to: transmit, to an image processing apparatus, identification information for identifying a login requestor; acquire account information transmitted from the image processing apparatus when the identification information is registered in the image processing apparatus; cause the information processing device to log in to a server using the account information; and perform at least one of: acquiring image data from the server and transmitting the image data and the identification information to the image processing apparatus; and transmitting an image reading request and the identification information to the image processing apparatus, acquiring image data from the image processing apparatus, and transmitting the image data acquired from the image processing apparatus, to the server.

11 Claims, 11 Drawing Sheets

NON-TRANSITORY STORAGE MEDIUM STORING INSTRUCTIONS, INFORMATION PROCESSING DEVICE, IMAGE PROCESSING APPARATUS, AND IMAGE PROCESSING SYSTEM

CROSS REFERENCE TO RELATED APPLICATION

The present application claims priority from Japanese Patent Application No. 2013-111418, which was filed on May 28, 2013, the disclosure of which is herein incorporated by reference in its entirety.

BACKGROUND OF THE INVENTION

1. Field of the Invention

The present invention relates to a non-transitory storage medium storing instructions, an information processing device, an image processing apparatus, and an image processing system.

2. Description of the Related Art

There is conventionally known a technique which requires authentication to cause an image processing apparatus to execute a job. The authentication can limit a user using the image processing apparatus, making it convenient for managing the use of the image processing apparatus.

As one example of this technique, there is known a printing system including: a printing device; a client terminal for transmitting a print job to the printing device; and a domain controller for executing user identification. In this printing system, the client terminal acquires authentication information in advance from the domain controller, and this authentication information is attached to a print job when the client terminal transmits the print job to the printing device. Based on the authentication information attached to the print job, the printing device requests the domain controller to execute the authentication. If this authentication results in a success, execution of the print job is permitted.

SUMMARY OF THE INVENTION

Recently, a system for downloading data from a server on the internet and printing the data has been practiced. Also, in many workplaces, a device used by a user for private use is used also for business use. Under these circumstances, a single user may own a plurality of accounts for the server for the use of the printing system described above. In such operation of the system, for example, there is a possibility that a printing device for business use may be controlled to print private data acquired when the user has logged in using an account for private use.

This invention has been developed to provide a technique of strictly managing execution of a job in an image processing system including an image processing apparatus requiring authentication for the execution of the job.

The present invention provides a non-transitory storage medium storing a plurality of instructions. The plurality of instructions, when executed by a processor of an information processing device, cause the processor to: transmit, to an image processing apparatus, identification information for identifying a login requestor requesting a login to a server; after the transmission of the identification information, acquire account information transmitted from the image processing apparatus when the identification information transmitted is registered in the image processing apparatus; cause the information processing device to log in to the server using the acquired account information; and after a success of the login, perform at least one of (i) acquiring image data from the server and transmitting a recording request including the acquired image data and the identification information to the image processing apparatus and (ii) transmitting an image reading request including the acquired identification information to the image processing apparatus, acquiring image data from the image processing apparatus, and transmitting the image data acquired from the image processing apparatus, to the server.

The present invention also provides an information processing device, including: a communication device configured to communicate with an image processing apparatus and a server; and a controller. The controller is configured to: transmit, to an image processing apparatus, identification information for identifying a login requestor requesting a login to a server; after the transmission of the identification information, acquire account information transmitted from the image processing apparatus when the identification information transmitted is registered in the image processing apparatus; cause the information processing device to log in to the server using the acquired account information; and after a success of the login, perform at least one of (i) acquiring image data from the server and transmitting a recording request including the image data and the identification information to the image processing apparatus and (ii) transmitting an image reading request including the identification information to the image processing apparatus, acquiring image data from the image processing apparatus, and transmitting the image data acquired from the image processing apparatus, to the server.

The present invention also provides an image processing apparatus, including: a communication device configured to communicate with an information processing device; a storage device configured to store account information and identification information in association with each other, wherein the account information is used for a login to a server, and the identification information is for identifying a login requestor requesting a login to the server, an image processing device configured to execute an image processing; and a controller. The controller is configured to: read the account information associated with the identification information from the storage device and transmit the account information to the information processing device, when the identification information is received from the information processing device; register registration information indicating that the information processing device is being logged in on the server, in association with the identification information when a login success notification is received, wherein the login success notification is a notification transmitted when the information processing device is logged in to the server using the transmitted account information; and perform: determining whether the identification information registered includes identification information identical to identification information attached to a job, when the job for causing the image processing device to execute the image processing is received; executing the job when there is identification information identical to the identification information attached to the job; and not executing the job when there is no identification information identical to the identification information attached to the job.

The present invention also provides an image processing system including: an image processing apparatus; and an information processing device. The information processing device includes: a communication device configured to communicate with the image processing apparatus and a server capable of storing image data; and a controller. The controller of the information processing device is configured to: transmit, to the image processing apparatus, identification information for identifying a login requestor requesting a login to a server; after the transmission of the identification information, acquire account information transmitted from the image processing apparatus when the transmitted identification information is registered in the image processing apparatus; cause the information processing device to log in to the server using the acquired account information; transmit a login success notification to the image processing apparatus when the login results in a success; and after the success of the login, perform at least one of (i) acquiring image data from the server and transmitting the acquired image data and a print request attached with the identification information as a job to the image processing apparatus and (ii) transmitting an image reading request attached with the identification information as a job to the image processing apparatus, acquiring image data from the image processing apparatus, and transmitting the image data acquired from the image processing apparatus, to the server. The image processing apparatus includes: a communication device configured to communicate with the information processing device and the server; a storage device configured to store account information and identification information in association with each other, wherein the account information is used for a login to the server, and the identification information is for identifying a login requestor requesting a login to the server; an image processing device configured to execute an image processing; and a controller. The controller of the image processing apparatus is configured to: read the account information associated with the identification information from the storage device and transmit the account information to the information processing device when the identification information is received from the information processing device; register registration information that the information processing device is being logged in on the server, in association with the identification information when the login success notification is received from the information processing device; and perform: determining whether the identification information registered includes identification information identical to identification information attached to a job, when the job for causing the image processing device to execute the image processing is received; executing the job when there is identification information identical to the identification information attached to the job; and not executing the job when there is no identification information identical to the identification information attached to the job.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which.

DETAILED DESCRIPTION OF THE EMBODIMENT

Hereinafter, there will be described an image processing system according to one embodiment of the present invention by reference to the drawings. In this embodiment, the present invention is applied to an image processing system including: a multi-function peripheral (MFP); a mobile device configured to control the MFP; and an image server for storing image data sets.

Overall Configuration of Image Processing System

Figure 1:
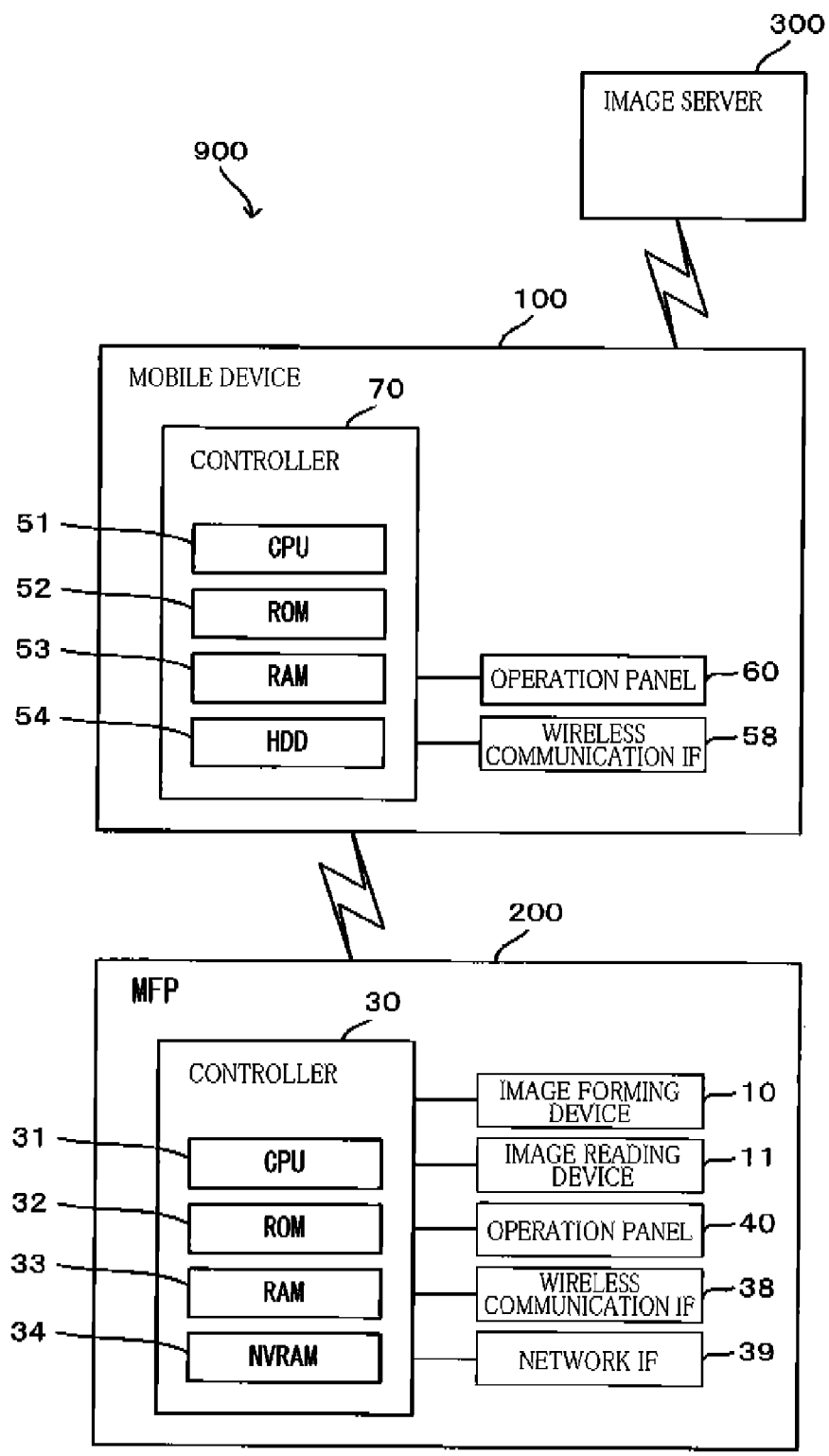
FIG. 1 is a block diagram illustrating a configuration of an image processing system.

As illustrated in FIG. 1, a present image processing system 900 as one example of an image processing system includes: a mobile device 100 as one example of the information processing device; an MFP 200 as one example of an image processing apparatus; and an image server 300. The MFP 200 has at least a printing function and a reading function. The mobile device 100 accepts or receives a print command and a reading command from a user and transmits a print request and an image reading request to the MFP 200. The image server 300 stores image data sets and transmits and receives image data sets to and from the mobile device 100 as needed.

The image processing system 900 may include, in addition to the MFP 200, any number of image processing apparatus each configured to execute an image processing. Also, the image processing system 900 may include any number of servers each for storing image data sets in addition to the image server 300. Also, the image processing system 900 may include, in addition to the mobile device 100, any number of information processing devices each configured to control the MFP 200.

Configuration of Mobile Device

There will be next explained an overall configuration of the mobile device 100. As illustrated in FIG. 1, the mobile device 100 includes a controller 70 including: a CPU 51 configured to execute various processes; a ROM 52 configured to store data and programs such as a startup program (BIOS) to be executed by the CPU 51 at startup of the mobile device 100; a RAM 53 used as a temporary storage area when the CPU 51 executes various processes; and a hard disc drive (HDD) 54 configured to store various programs and data. The controller 70 is a collective term of a plurality of sets of hardware used for controlling the mobile device 100 such as the CPU 51, and the controller 70 does not always represent a single set of hardware provided in the mobile device 100. The CPU 51 is one example of a controller of the information processing device. It is noted that the controller 70 may be the controller of the information processing device.

The HDD 54 stores an operating system (OS) and a driver, as one example of a program, for controlling the MFP 200. In addition to these programs, the HDD 54 may store various kinds of application programs such as a word processor, a drawing program, a spreadsheet program, and a graphics editing program.

The mobile device 100 also includes an operation panel 60 in the form of a touch panel and a wireless communication interface 58 which are electrically connected to and controlled by the controller 70. The wireless communication interface 58 is hardware for wireless communication other devices. The wireless communication interface 58 is one example of a communication device of the information processing device. In a case where the MFP 200 and the image server 300 use different communication methods, each of the MFP 200 and the image server 300 may be provided with hardware for communicating with a partner device. For example, in a case where the communication with the image server 300 uses WiFi™, and the communication with the MFP 200 uses Near Field Communication (NFC), the wireless communication interface 58 may be constituted by hardware for WiFi and hardware for NFC.

The image server 300 is similar to the mobile device 100 in structure. The image server 300 requires a login processing for allowing the use of the image server 300. Specifically, the image server 300 allows only a login user who is a user being logged in to access to image data sets stored in the storage area of the image server 300. In the image server 300, a storage area is assigned to each login user, i.e., each account, and one or more image data sets are stored in each storage area.

Configuration of MFP

There will be next explained an overall configuration of the MFP 200. As illustrated in FIG. 1, the MFP 200 includes a controller 30 including: a CPU 31 configured to execute various processes; a ROM 32 configured to store data and programs such as a program for a startup program (BIOS) to be executed by the CPU 31 at startup of the MFP 200; a RAM 33 used as a temporary storage area when the CPU 31 executes various processes; and a non-volatile ram (NVRAM) 34 configured to store various programs and data. The controller 30 is a collective term of a plurality of sets of hardware used for controlling the MFP 200 such as the CPU 31, and the controller 30 does not always represent a single set of hardware provided in the MFP 200. The CPU 31 is one example of a controller of the image processing apparatus. It is noted that the controller 30 may be the controller of the image processing apparatus.

The MFP 200 further includes: an image forming device 10 configured to print an image on a sheet; an image reading device 11 configured to read an image on a document; an operation panel 40 configured to display the operation of the MFP 200 and accept a user input; a wireless communication interface 38; and a network interface 39, which are controlled by the CPU 31. The wireless communication interface 38 is hardware for wireless communication with other devices. The network interface 39 is hardware for communication with other devices via an LAN cable. Each of the wireless communication interface 38 and the network interface 39 is one example of a communication device of the image processing apparatus.

The image forming device 10 may perform only monochrome printing and may perform both of color printing and monochrome printing. In the present embodiment, the image forming device 10 can perform both of color printing and monochrome printing. Also, the image forming device 10 may execute any of electronic photographic printing and ink-jet printing. Also, the image reading device 11 may perform monochrome scanning and may perform both of color scanning and monochrome scanning. In the present embodiment, the image forming device 10 can perform both of color scanning and monochrome scanning. Also, a reading mechanism may be any of a charge-coupled device (CCD) and a contact image sensor (CIS). Each of the image forming device 10 and the image reading device 11 is one example of an image processing device.

Overview of Recording Operation in Image Processing System

Figure 2:
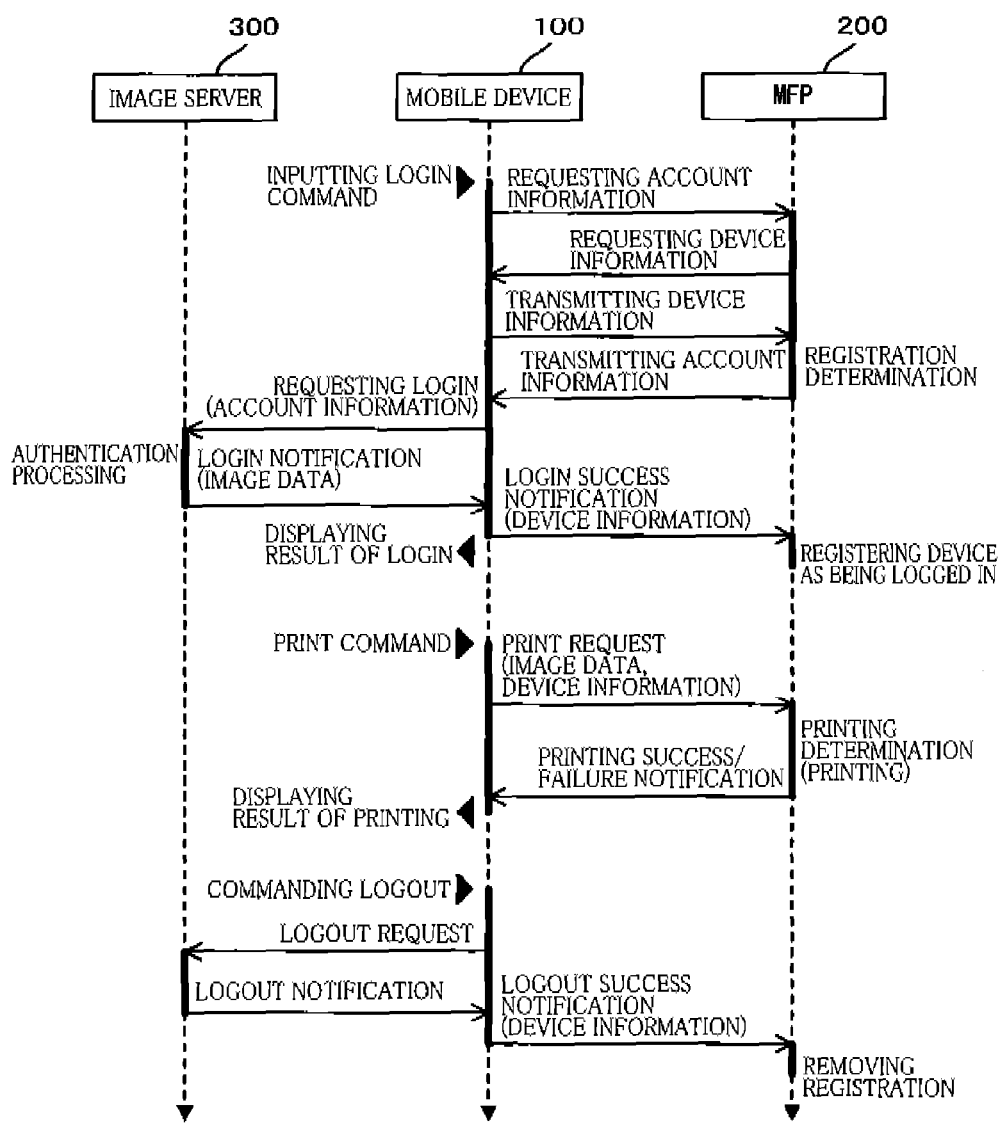
FIG. 2 is a sequence diagram illustrating an overview of operations performed when printing is carried out in the image processing system.

There will be next explained, with reference to FIG. 2, a procedure of printing performed in the image processing system 900. In this procedure, image data sets stored in the image server 300 are downloaded to the mobile device 100 and printed by the MFP 200.

Before the MFP 200 carries out printing, a login of the mobile device 100 to the image server 300 and a download of the image data sets from the image server 300 to the mobile device 100 are required. Thus, the user inputs a login command to the mobile device 100.

When having received the login command, the mobile device 100 sends the MFP 200 an account information request for requesting a transmission of account information which is required for the mobile device 100 to log in to the image server 300. Having received the account information request, the MFP 200 sends the mobile device 100 a device information request for a transmission of device information about the mobile device 100.

When having received the device information request, the mobile device 100 sends the MFP 200 the device information containing a device ID and a user ID. The device ID is an ID number for identifying a corresponding device. The device ID may be any kind of information as long as the device ID can identify a device between the MFP 200 and a login requestor which is a device requesting the login. Examples of the device ID include a MAC address in addition to a specific ID used between the mobile device 100 and the MFP 200. The user ID is an ID for identifying a user requesting the login. The user ID may be the same as an account for the login to the image server 300 and may be a specific ID used between the mobile device 100 and the MFP 200. The user ID may be acquired by a user input performed upon the input of the login command, for example. Alternatively, in a case where a user is being logged in on the mobile device 100, a user ID of the user may be automatically acquired. The device information is one example of identification information or an identification information seat.

When having received the device information, the MFP 200 determines whether or not the device ID and the user ID contained in the device information match information registered in advance in the MFP 200.

Figure 3:
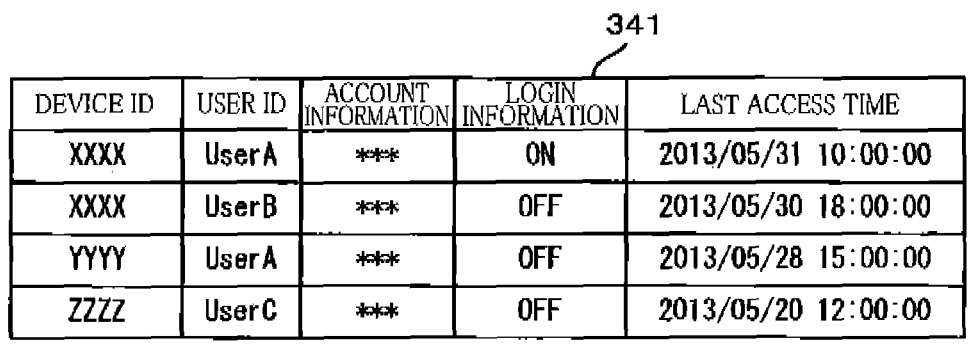
FIG. 3 is a view illustrating a device management database.

Specifically, the NVRAM 34 of the MFP 200 stores a device management database 341 as illustrated in FIG. 3. The device management database 341 stores a plurality of records each containing the device ID, the user ID, the account information, login information, and a last access date and time. The account information is information which is required for the login to the image server 300 and contains an account and a password. The login information is indicative of a login state to the image server 300, and the ON state of the login information indicates that the corresponding device is being logged in, and the OFF state indicates that the corresponding device is not logged in. The last access date and time is representative of a time when the MFP 200 had been used most recently.

After receiving the device information, the MFP 200 refers to the device management database 341 to determine whether a record that contains the device ID and the user ID contained in the received device information is registered or not. In a case where such a record is registered, account information contained in the record is transmitted to the mobile device 100. In a case where such a record is not registered, on the other hand, an error signal is transmitted.

When having received the account information from the MFP 200, the mobile device 100 transmits a login request to the image server 300. The account information received from the MFP 200 is attached to the login request. That is, the mobile device 100 uses the account information received from the MFP 200 to log in to the image server 300.

The image server 300 executes an authentication processing based on the account information attached to the login request. Upon permitting the login of the mobile device 100, the image server 300 transmits a login notification to the mobile device 100. Furthermore, upon permitting the login of the mobile device 100, the image server 300 sends the mobile device 100 all image data sets stored in a storage area assigned to the login user. In the case of not permitting the login, the image server 300 transmits an error signal to the mobile device 100.

When having received the login notification, the mobile device 100 sends the MFP 200 a login success notification indicating a success of the login. The device information is attached to the login success notification. Also, the mobile device 100 controls the operation panel 60 to display a message indicating the success of the login. It is noted that in a case where the login notification is not received, the mobile device 100 controls the operation panel 60 to display a message indicating a failure of the login.

When having received the login success notification, the MFP 200 registers the mobile device 100 as being logged in. Specifically, in a record corresponding to the device information attached to the received login success notification in the device management database 341, the login information is changed to "ON", and the time of this change is stored as a last access time. As a result, a preliminary operation for causing the MFP 200 to carry out printing is completed.

After completion of the preliminary operation, the mobile device 100 accepts a selection of one or more image data sets to be used for color printing among the received image data sets. Furthermore, the mobile device 100 accepts a print command for causing the MFP 200 to print the selected image data set or sets. Upon input of the print command, the mobile device 100 transmits a print request to the MFP 200. The device information and the image data set or sets to be printed are attached to the print request.

When having received the print request from the mobile device 100, the MFP 200 refers to the device management database 341 to determine, based on the device information attached to the print request, whether the mobile device 100 is being logged in on the image server 300 or not. When the mobile device 100 is being logged in, the MFP 200 controls the image forming device 10 to print the image data set or sets attached to the print request. An error occurs when the mobile device 100 is not being logged in, when the device information is not registered, or when the printing is failed.

The MFP 200 thereafter sends the mobile device 100 a printing success/failure notification indicating a result of the printing. In a case where the printing results in a success, a time of completion of the printing in the device management database 341 is stored as the last access time. When having received the printing success/failure notification, the mobile device 100 displays a result of the printing on the operation panel 60.

When having received a logout command during login to the image server 300, the mobile device 100 transmits a logout request to the image server 300. When having received the logout request, the image server 300 causes the mobile device 100 to log out and transmits the logout notification to the mobile device 100.

When having received the logout notification, the mobile device 100 sends the MFP 200 a logout success notification indicating that the logout results in a success. The device information is attached to the logout success notification.

When having received the logout success notification, the MFP 200 removes the registration of the mobile device 100 as being logged in. Specifically, in the record corresponding to the device information attached to the logout success notification in the device management database 341, the login information is changed to "OFF".

In the present image processing system 900, when the MFP 200 is caused to print the image data sets stored in the image server 300, the mobile terminal 100 logs in to the image server 300 based on the account information stored in the MFP 200. Accordingly, the image data sets to be printed by the MFP 200 can be limited to those owned by devices or users managed using the accounts stored in the MFP 200.

Overview of Reading Operation in Image Processing System

Figure 4:
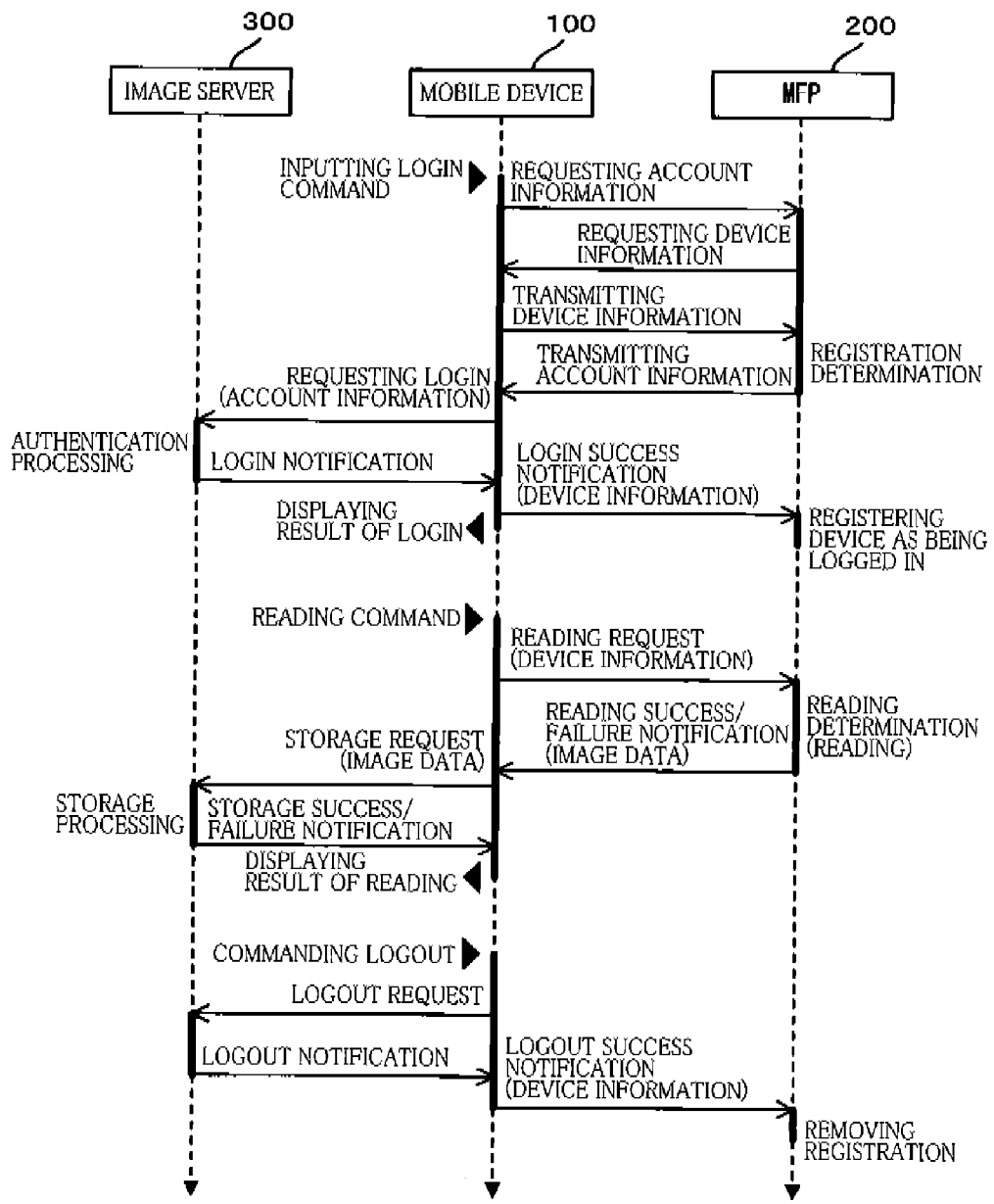
FIG. 4 is a sequence diagram illustrating an overview of operations performed when image reading is carried out in the image processing system.

There will be next explained, with reference to FIG. 4, a procedure of reading performed in the image processing system 900. In this procedure, image data sets read by the MFP 200 are transmitted to the mobile device 100 and stored into a predetermined storage area of the image server 300.

Before the MFP 200 performs reading, as in the recording operation, the mobile device 100 logs in to the image server 300 based on the account information stored in the MFP 200. It is noted that the preliminary operation for reading does not require a download of the image data sets stored in the image server 300.

After completion of the preliminary operation, the mobile device 100 accepts a reading command for starting reading of a document or documents set on the MFP 200. Upon input of the reading command, the mobile device 100 transmits the image reading request to the MFP 200. The device information is attached to the image reading request.

When having received the image reading request from the mobile device 100, the MFP 200 refers to the device management database 341 to determine, based on the device information attached to the image reading request, whether the mobile device 100 is being logged in on the image server 300 or not. When the mobile device 100 is being logged in, the MFP 200 controls the image reading device 11 to read an image or images on the document(s). Upon completion of the reading, the MFP 200 transmits a reading success notification to the mobile device 100. Image data set or sets are attached to the reading success notification. Also, a time of completion of the reading in the device management database 341 is stored as the last access time. An error occurs when the mobile device 100 is not being logged in, when the device information is not registered, or when the reading is failed.

In a case where the reading results in a success, that is, image data set or sets have been acquired, when a result of reading is received from the MFP 200, the mobile device 100 transmits a storage request to the image server 300. The image data set(s) received from the MFP 200 are attached to the storage request.

When having received the storage request from the mobile device 100, the image server 300 stores the image data set(s) attached to the storage request, into a storage area assigned to the login user. The image server 300 then transmits a success/failure notification to the mobile device 100. It is noted that an error occurs in a case where the storage of the image data set(s) has failed because of lack of space fir the image data set(s) in the storage area, for example. When having received the success/failure notification, the mobile device 100 controls the operation panel 60 to display a result of reading and storing.

In the present image processing system 900, when the image data sets acquired by reading performed by the MFP 200 are stored into the image server 300, the mobile terminal 100 logs in to the image server 300 based on the account information stored in the MFP 200. Accordingly, the image data sets to be stored into the image server 300 can be limited to those owned by devices or users managed using the accounts stored in the MFP 200.

Figure 5:
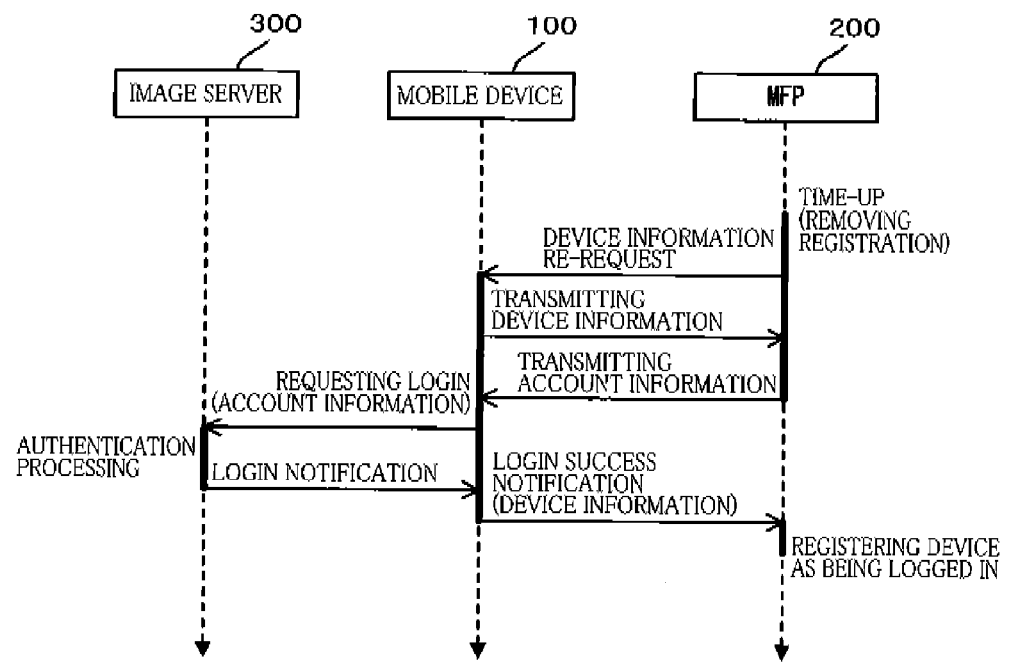
FIG. 5 is a sequence diagram illustrating an overview in a case where a processing has not been executed.

Overview of Operation in the Case where Processing has not been Executed During Login There will be next explained, with reference to FIG. 5, an overview of operations performed in a case where a request of the image processing has not been received by the MFP 200 for equal to or longer than a predetermined length of time in a state in which the information that the mobile device 100 is being logged in is registered in the MFP 200. This procedure is executed in a case where the information that the mobile device 100 is being logged in is registered, and the mobile device 100 has not transmitted the request of the image processing to the MFP 200 for equal to or longer than the predetermined length of time.

Some image servers automatically cause a logout in the event of lack of access within a specific time period. In another case, a logout is caused in response to the logout request transmitted from the mobile device 100 when a communication between the mobile device 100 and the MFP 200 is not available. In these cases, the MFP 200 cannot recognize that the mobile device 100 has logged out from the image server 300, and the MFP 200 continues keeping the information that the mobile device 100 is being logged in. That is, the MFP 200 is kept in a state in which the mobile device 100 can use the MFP 200. Such a state leads to an unauthorized use of the MFP 200. Thus, the MFP 200 issues a request of a re-registration of the login state, to a device that has not issued a request of the image processing to the MFP 200 for equal to or longer than the predetermined length of time in the state in which the information that the device is being logged in is registered.

For the re-registration of the login state, the MFP 200 is initially removes the registration of the information that the mobile device 100 is being logged in, in a case where equal to or longer than the predetermined length of time has elapsed from a point in time when the information that the mobile device 100 is being logged in is registered or a point in time when the image processing is most recently executed in response to the request of the mobile device 100. Specifically, the start of the elapsed time is the last access time stored in the device management database 341.

After removing the registration of the information that the mobile device 100 is being logged in, the MFP 200 sends the mobile device 100 a device information re-request for requesting a retransmission of the device information. When having received the device information re-request, the mobile device 100 transmits the device information to the MFP 200.

When having received the device information, the MFP 200 sends the mobile terminal 100 account information corresponding to the device information, in a case where the device information is registered. When having received the account information, the mobile device 100 uses the account information to log in to the image server 300. The image server 300 transmits the login notification to the mobile device 100.

After receiving the login notification, the mobile device 100 transmits the login success notification to the MFP 200. When having received the login success notification, the MFP 200 again registers the information that the mobile device 100 is being logged in. That is, the transfer of the device information, the transfer of the account information, and the login are sequentially carried out. As a result, the re-registration of the login state is finished.

Operations of Mobile Device

Login Request Processing

Figure 6:
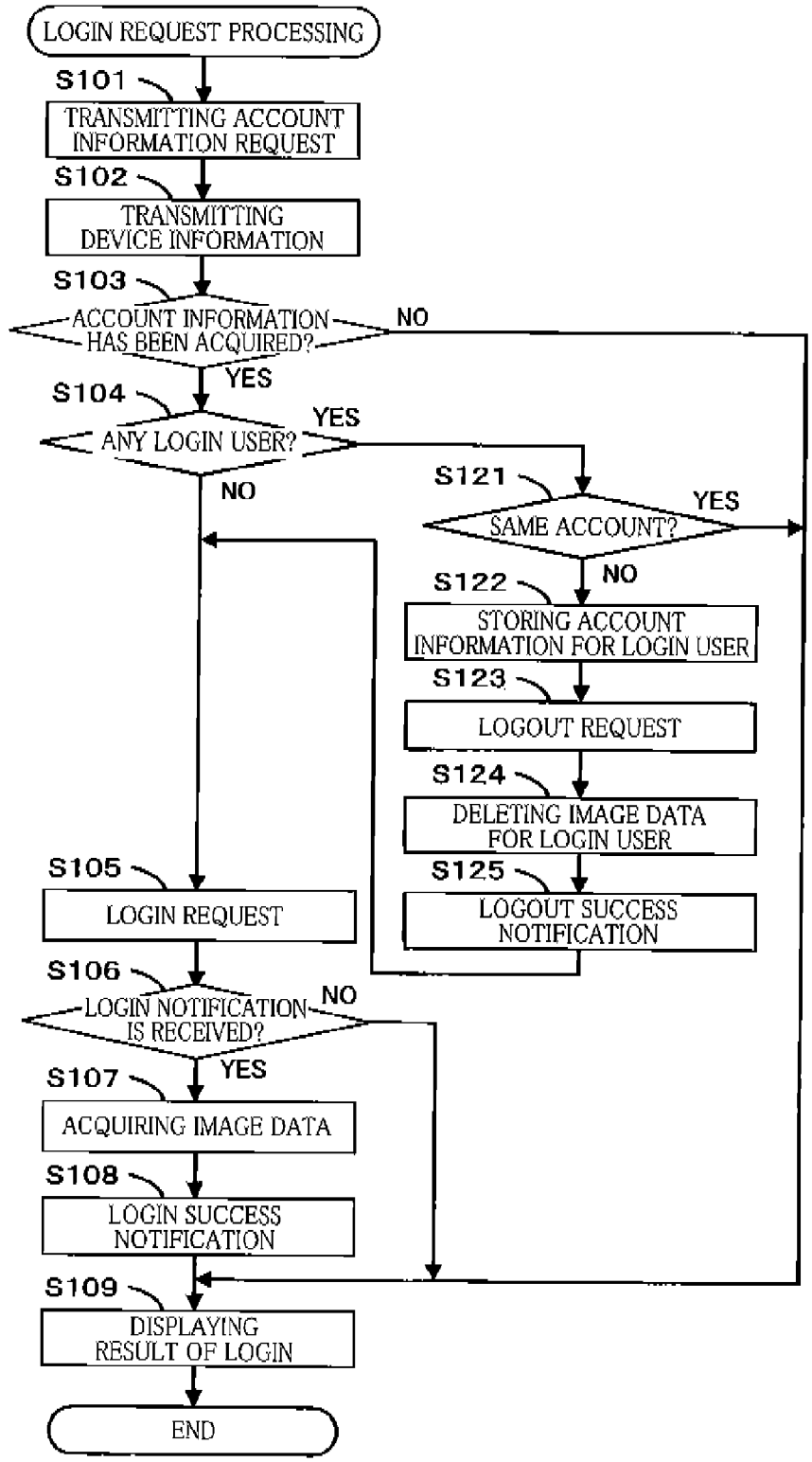
FIG. 6 is a flow chart illustrating a procedure of a login request processing to be executed by a mobile device.

There will be next explained, with reference to FIG. 6, a login request processing to be executed by the mobile device 100 to execute the above-described procedure of the operations of the image processing system 900. The login request processing is executed by the CPU 51 when the login command is input to the mobile device 100. It is noted that the following explanation is provided, assuming that the login command is input, with the MFP 200 as a device to be requested.

This login request processing begins with S101 at which the CPU 51 transmits the account information request to the MFP 200. Having received the account information request, the MFP 200 transmits the device information request to the mobile device 100. After receiving the device information request, the CPU 51 at S102 transmits the device information to the MFP 200. After receiving the device information, the MFP 200 transmits the account information as a response in a case where the device information is stored in the device management database 341 of the MFP 200. In a case where the device information is not stored in the device management database 341, on the other hand, the MFP 200 transmits an error signal.

After receiving the response from the MFP 200, the CPU 51 at S103 determines based on the response whether the mobile device 100 has acquired the account information or not. When the account information is not acquired (S103: NO), the CPU 51 at S109 controls the operation panel 60 to display a message indicating a failure of a login, and the login request processing ends.

When the account information is acquired (S103: YES), the CPU 51 at S104 determines whether the mobile device 100 is being logged in on the image server 300 or not, that is, the CPU 51 determines whether there is a login user who is being logged in or not. When the is any login user (S104: YES), the CPU 51 at S121 determines whether the account contained in the acquired account information is the same as that of the login user or not, that is, the CPU 51 determines whether the account information has been acquired from the MFP 200 based on the same device information or not. When the accounts are the same (S121: YES), the CPU 51 at S109 controls the operation panel 60 to display information that the mobile device 100 has already been logged in, and the login request processing ends.

When the accounts differ from each other (S121: NO), the account information for the login user being logged in (hereinafter may be referred to as "previous login user") is stored at S122. At S123, the CPU 51 issues a logout request to the image server 300 for cancel of the login state of the previous login user. Also, the CPU 51 at S124 deletes, from the memory, the image data sets received as the image data sets for the previous login user. The CPU 51 at S125 transmits the logout success notification to the MFP 200. In view of the above, in a case where there is a login user different from the user having input the login command, the CPU 51 requests a logout for giving a higher priority to the user having input the login command and deletes the image data sets for the previous login user to free up the space in the memory.

It is noted that information about the previous login user is not registered in the MFP 200 in some cases. One example of these cases is that the previous login user manually inputs his or her account information into the mobile device 100 and logs in to the image server 300 based on this account information. In this case, even if the logout success notification is transmitted to the MFP 200 at S125, no processing is executed by the MFP 200.

After S125 or when there is no login user (S104: NO), the CPU 51 at S105 transmits the login request to the image server 300. The account information received from the MFP 200 is used for the login to the image server 300. Having received the login request, the image server 300 transmits the login notification to the mobile device 100 in a case where the login results in a success. The CPU 51 at S106 determines whether the mobile device 100 has received the login notification or not. When the login notification is not received (S106: NO), the CPU 51 at S109 controls the operation panel 60 to display a message indicating a failure of the login, and the login request processing ends.

In the case where the login results in a success, when the login notification is received (S 106: YES), the CPU 51 at S107 acquires the image data sets transmitted from the image server 300. This image data sets acquired are image data stored in the storage area assigned to the user having output the login command, i.e., a later login user. At S108, the CPU 51 transmits the login success notification to the MFP 200. Then at S 109, the CPU 51 controls the operation panel 60 to display a message indicating the login results in a success, and the login request processing ends. It is noted that the order of the processes at S107, S108, and S109 is not limited to the above-described order.

Logout Request Processing

Figure 7:
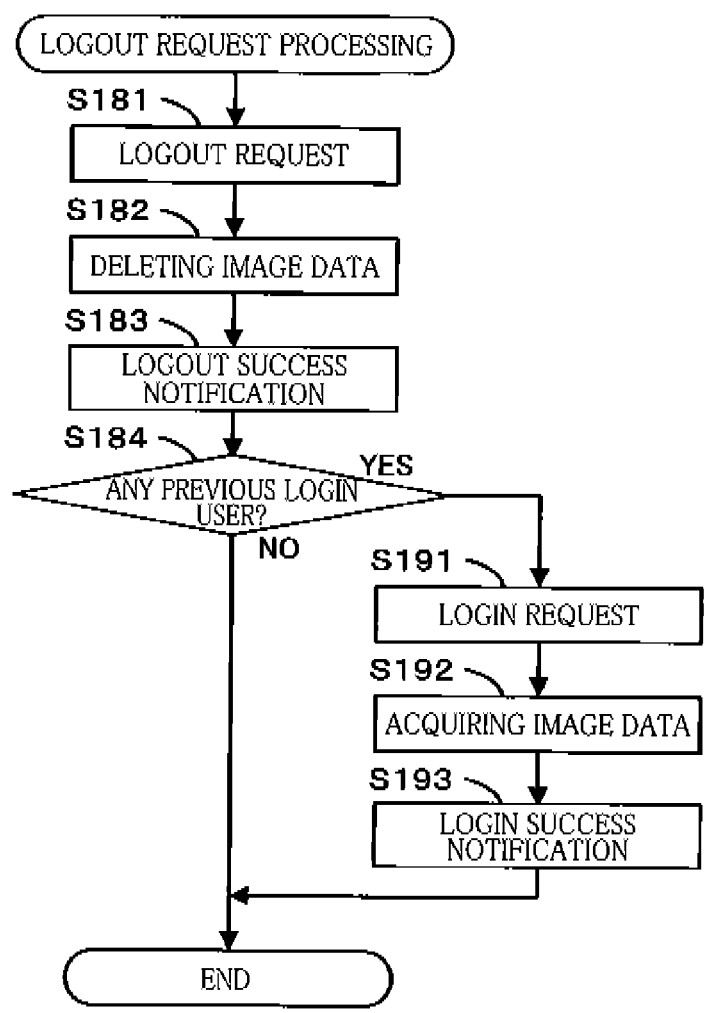
FIG. 7 is a flow chart illustrating a procedure of a logout request processing to be executed by the mobile device.

There will be next explained, with reference to FIG. 7, a logout request processing to be executed by the mobile device 100. The logout request processing is executed by the CPU 51 when the logout command is input to the mobile device 100.

The logout request processing begins with S181 at which the CPU 51 transmits the logout request to the image server 300. At S182, the CPU 51 deletes from the memory the image data sets received in the login. The processing at S181 and the processing at S182 may be executed in the reverse order or at the same time. Having received the logout request, the image server 300 transmits the logout notification. After receiving the logout notification, the CPU 51 at S183 transmits the logout success notification to the MFP 200.

The CPU 51 at S184 determines whether or not there is any information about a previous login user who is a login user just before the later login user having logged out. The information about the previous login user has been stored at S122 in the above-described login request processing. When the information about the previous login user has not been stored (S184: NO), the logout request processing ends.

On the other hand, when there is any information about the previous login user (S184: YES), the CPU 51 at S191 uses the information about the previous login user to transmit the login request to the image server 300. Thereafter, in a case where the login results in a success, the CPU 51 at S192 acquires the image data sets for the previous login user transmitted from the image server 300 and at S193 transmits the login success notification to the MFP 200, thereby returning to a state established before the login of the later login user having logged out. It is noted that information about the previous login user is not registered in the MFP 200 in some cases. One example of these cases is that the user manually inputs his or her account information into the mobile device 100 and logs in to the image server 300 based on this account information. In this case, even if the login success notification is transmitted to the MFP 200, no processing is executed by the MFP 200. Upon completion of the processing at S193, the logout request processing ends.

Operations of MFP

Login Management Processing

Figure 8:
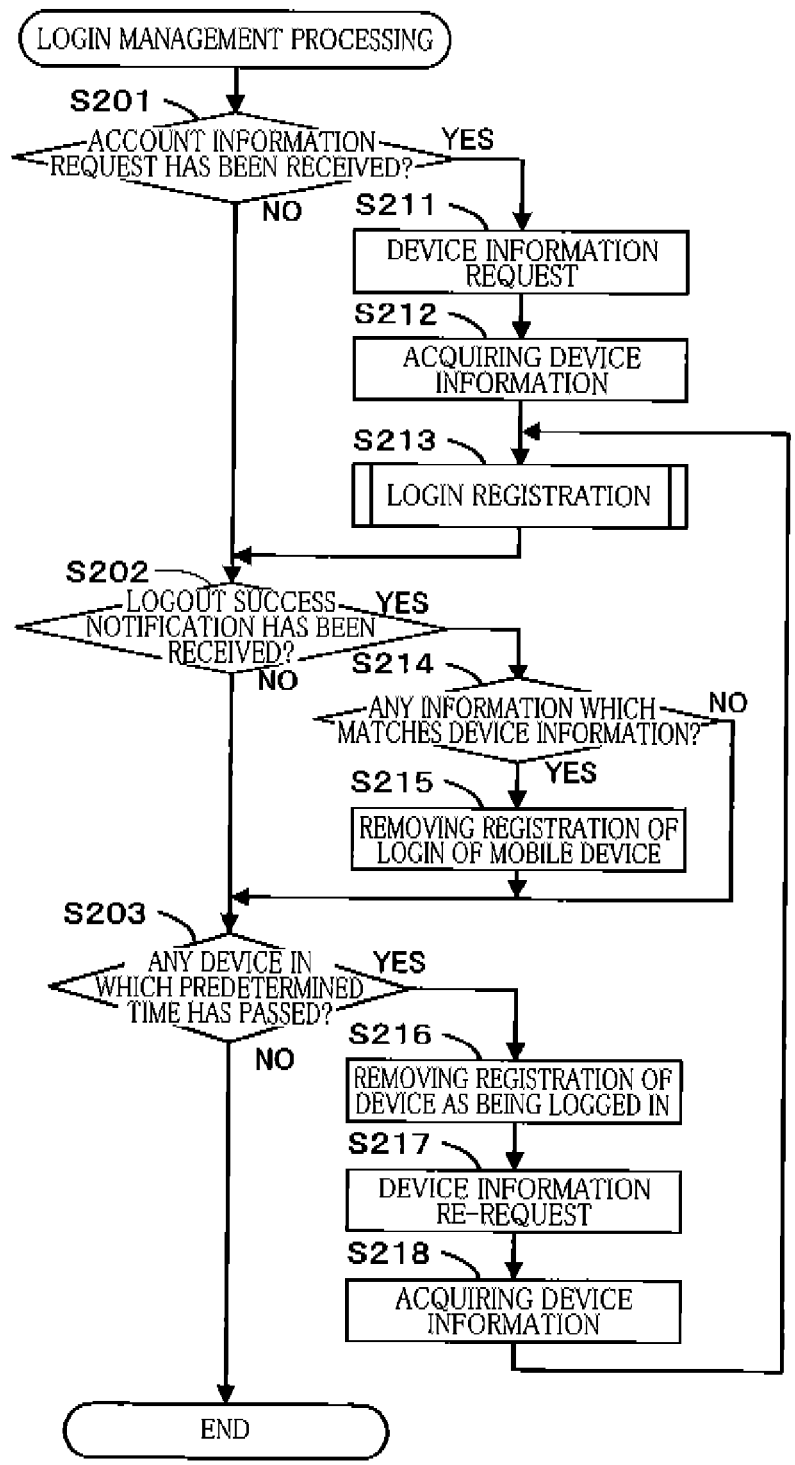
FIG. 8 is a flow chart illustrating a procedure of a login management processing to be executed by an MFP.

There will be next explained, with reference to FIG. 8, a login management processing to be executed by the MFP 200 to execute the above-described procedure of the operations of the image processing system 900. The login management processing is executed by the CPU 31 periodically (every one second, for example). It is noted that the following explanation is provided, assuming that requests and notifications received by the MFP 200 from another device are received from the mobile device 100.

The login management processing begins with S201 at which the CPU 31 determines whether the MFP 200 has received the account information request or not. When the account information request has been received (S201: YES), the MFP 200 at S211 transmits the device information request to a device having requested the account information, i.e., the mobile device 100. Having received the device information request, the mobile device 100 transmits the device information to the MFP 200. As a result, the MFP 200 at S212 acquires the device information about the mobile device 100.

Figure 9:
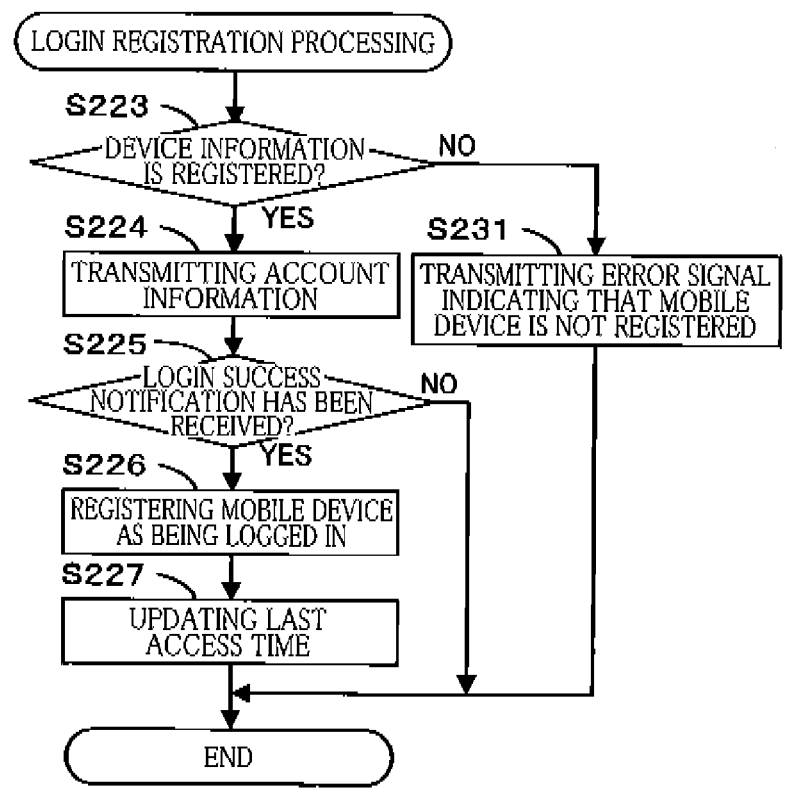
FIG. 9 is a flow chart illustrating a procedure of a login registration processing to be executed by the MFP.

After the processing at S212, the CPU 31 at S213 executes a login registration processing. FIG. 9 illustrates the login registration processing at S213. The login registration processing begins with S223 at which a record storing information which is the same as that acquired at S212 is registered in the device management database 341 or not. When the record is not registered (S223: NO), the MFP 200 at S231 sends the mobile device 100 an error signal indicating that the mobile device 100 is not registered, and the login registration processing ends.

When the record is registered (S223: YES), the CPU 31 at S224 reads the account information from the record and transmits the account information to the mobile device 100. Having received the account information, the mobile device 100 logs in to the image server 300 based on the account information and transmits a result of the login to the MFP 200. Thus, the CPU 31 at S225 determines whether the MFP 200 has received the login success notification from the mobile device 100 or not. When the login success notification is not received (S225: NO), the login registration processing ends.

When the login success notification is received (S225: YES), the CPU 31 at S226 registers the mobile device 100 as being logged in. Specifically, the login information in the record corresponding to the account information transmitted at S224 is changed to "ON". At S227, the time of the change is stored as the last access time in the record. Upon completion of the processing at S227, the login registration processing ends.

Returning to FIG. 8, after the login registration processing at S213 or when the account information request is not received (S201: NO), the CPU 31 at S202 determines whether the MFP 200 has received the logout success notification or not.

When the logout success notification is received (S202: YES), the CPU 31 at S214 determines whether a record storing information which matches the device information attached to the logout success notification is registered in the device management database 341 or not. When the record is registered (S214: YES), the CPU 31 at S215 removes the registration of the login of the mobile device 100 from the record corresponding to the device information attached to the logout success notification.

After S215, when the logout success notification is not received (S202: NO), or when the record storing the information which is the same as the device information attached to the logout success notification is not registered in the device management database 341 (S214: NO), the CPU 31 determines whether there is any device in which equal to or longer than the predetermined length of time has passed from the last access date and time among login device(s) each of which is a device which is registered as being logged in. When there is no device in which equal to or longer than the predetermined length of time has passed from the last access date and time (S203: NO), the login management processing ends.

When there is any device in which equal to or longer than the predetermined length of time has passed from the last access date and time (S203: YES), the CPU 31 at S216 removes the registration of the information that the device is being logged in. The MFP 200 at S217 transmits the device information re-request to the device. When the device to which the device information re-request is transmitted has received the device information re-request, the device transmits the device information to the MFP 200 as in the case of the device information request. Thus, the MFP 200 at S218 acquires the device information about the device. After the processing at S218, this flow goes to S213 at which the CPU 31 executes the login registration processing. In the login registration processing, the MFP 200 at S224 sends the device the account information as a request command for requesting a relogin of the device on the image server 300. When the relogin of the device having received the request command for relogin results in a success, the login success notification is transmitted from the device to the MFP 200. As described above, the login registration is executed again for the device in which equal to or longer than the predetermined length of time has passed from the last access date and time.

Print Job Processing

Figure 10:
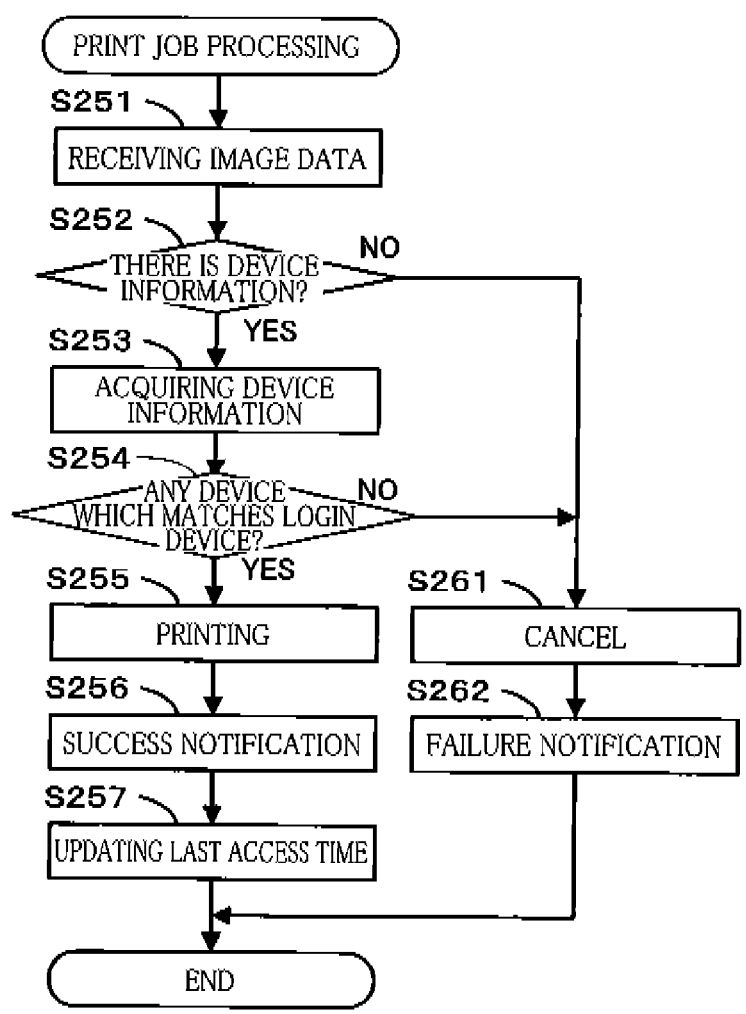
FIG. 10 is a flow chart illustrating a procedure of a print job processing to be executed by the MFP.

There will be next explained, with reference to FIG. 10, a print job processing to be executed by the MFP 200. The print job processing is executed by the CPU 31 when a print request is received, that is, when a print job is received. It is noted that the following explanation is provided, assuming that the MFP 200 has received the print request from the mobile device 100.

The print job processing begins with S251 at which the CPU 31 starts receiving the image data sets. The CPU 31 at S252 determines whether the print request is attached with the device information or not. When the print request is not attached with the device information (S252: NO), the CPU 31 at S261 cancels the print job and at S262 sends the mobile device 100 an error notification indicating a failure of printing. After the processing at S262, the print job processing ends.

When the print request is attached with the device information (S252: YES), the CPU 31 at S253 acquires the device information. The CPU 31 at S254 refers to the device management database 341 to determine whether there is any device matching the acquired device information among the login devices each of which is a device which is registered as being logged in. That is, the CPU 31 determines whether there is any record in which the acquired device information matches the device ID and the user ID among records each containing login information whose state is "ON". When there is no device matching the acquired device information among the login devices (S254: NO), the CPU 31 at S261 cancels the print job and at S262 transmits the error notification to the mobile device 100, and the print job processing ends.

When there is any device matching the acquired device information among the login devices (S254: YES), the MFP 200 at S255 starts printing the received image data sets. Upon completion of the printing, the CPU 31 at S256 notifies the mobile device 100 of a success of the printing. The CPU 31 at S257 stores the time of completion of the printing as the last access time. After the processing at S257, the print job processing ends.

Reading Job Processing

Figure 11:
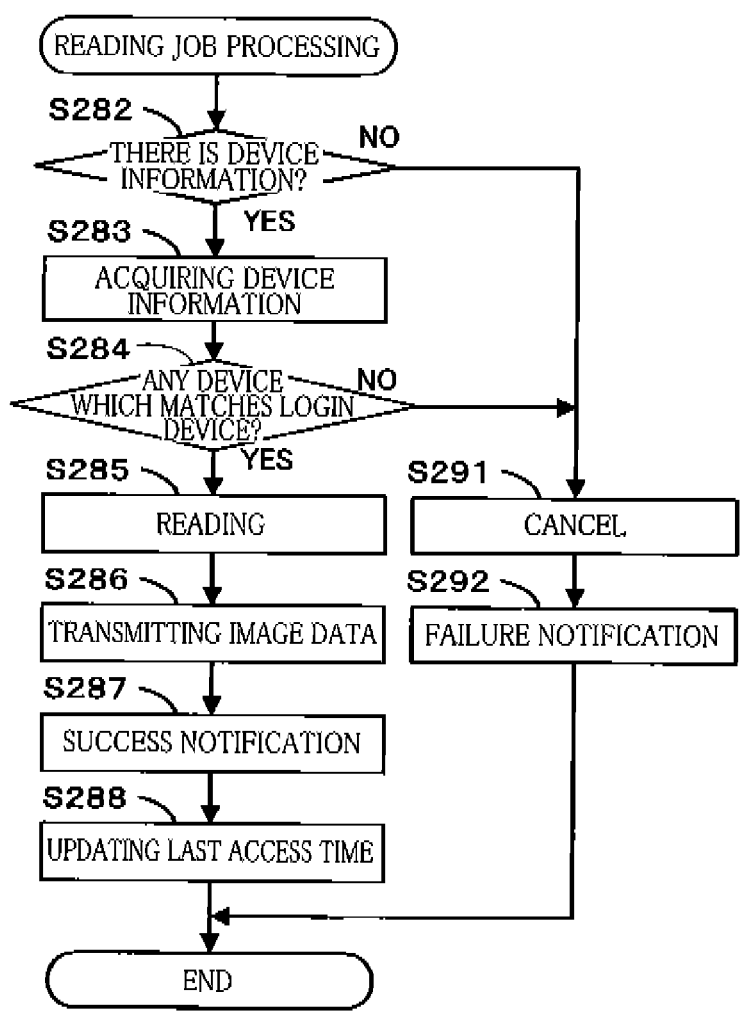
FIG. 11 is a flow chart illustrating a procedure of a reading job processing to be executed by the MFP.

There will be next explained, with reference to FIG. 11, a reading job processing to be executed by the MFP 200. The reading job processing is executed by the CPU 31 when an image reading request is received, that is, when a reading job is received. It is noted that the following explanation is provided, assuming that the MFP 200 has received the image reading request from the mobile device 100.

The reading job processing begins with S282 at which the CPU 31 determines whether the image reading request is attached with the device information or not. When the image reading request is not attached with the device information (S282: NO), the CPU 31 at S291 cancels the reading job and at S292 sends the mobile device 100 an error notification indicating a failure of reading. After the processing at S292, the reading job processing ends.

When the image reading request is attached with the device information (S282: YES), the CPU 31 at S283 acquires the device information. The CPU 31 at S284 refers to the device management database 341 to determine whether or not there is any device matching the acquired device information among the login devices. When there is no device matching the acquired device information among the login devices (S284: NO), the CPU 31 at S291 cancels the reading job and at S292 transmits the error notification to the mobile device 100, and the reading processing ends.

When there is any device matching the acquired device information among the login devices (S284: YES), the MFP 200 at S285 starts reading a document. At S286, the MFP 200 starts transmitting read image data sets to the mobile device 100. Upon completion of the transmission of the image data sets, the CPU 31 at S287 notifies the mobile device 100 of a success of the reading. The CPU 31 at S288 stores the time of completion of the transmission as the last access time. After the processing at S288, the reading job processing ends.

In the present image processing system 900 as described above, the device and the user registered in the MFP 200 are given the account information from the MFP 200 and use this account information to log in to the image server 300. Only the device being logged in can use the MFP 200. That is, the MFP 200 manages the accounts for the image server 300, and only the accounts managed by the MFP 200 can use the MFP 200. Accordingly, in a case where the MFP 200 is configured to manage only accounts for business use, for example, the image data sets are transferred between the MFP 200 and the image server 300 using only the account for business use. This makes it impossible to cause the MFP 200 to print image data sets acquired using an account for private use, for example. Also, image data sets, for example, acquired by reading of the MFP 200 using an account for business use cannot be stored into a storage area of the image server 300 which is assigned to an account for private use. This leads to prevention of private use of the MFP 200 and a leakage of information.

While the embodiment of the present invention has been described above, it is to be understood that the invention is not limited to the details of the illustrated embodiment, but may be embodied with various changes and modifications, which may occur to those skilled in the art, without departing from the spirit and scope of the invention. For example, the image processing apparatus may be any apparatus as long as the apparatus has an image processing function, and examples of the image processing apparatus include a copying machine, a printer, a facsimile machine, and a scanner in addition to the MFP. The information processing device may be any device as long as the device can request the image processing and relay the image data sets. The information processing device is not limited to a small terminal device such as the mobile device and may be a large computer.

The mobile device 100 and another device are connected to each other over wireless communication in the above-described embodiment, but in a case where the mobile device 100 includes a wired communication interface such as a network interface and a USB interface, the mobile device 100 and another device are connected to each other over wired communication via the interface.

The device management database 341 manages the account information for the image server 300 in the above-described embodiment, but in a case where a plurality of image servers are provided. The image processing system 900 may be configured such that device management tables are provided for the respective servers, and when transmitting the account information request or the device ID, the mobile device 100 may designate a server on which the mobile device 100 is to log in.

While all the image data sets for the login user are downloaded to the mobile device 100 upon the login in the above-described embodiment, the timing of the download is not limited to this timing. For example, the image processing system 900 may be configured such that only a list of the image data sets for the login user is downloaded, and only image data sets to be printed are downloaded when a print command is received.

The device information contains both of the device ID which is information specific to the device and the user ID which is information about a user using the device in the above-described embodiment, but if only one set of account information can be assigned to one device ID, the user ID is not necessary. If one set of account information can be assigned to one user ID, the device ID is not necessary.

The relogin is automatically performed in the case where a process has not been executed in the above-described embodiment, but the present invention is not limited to this configuration. For example, the image processing system 900 may be configured such that a display of a message of the relogin is requested to the mobile device 100, and a user manually commands the relogin. Also, the image processing system 900 may be configured to cause the user to choose whether the relogin is to be carried out or not, when a process has not been executed for equal to or longer than the predetermined length of time. Also, even when a process has not been executed for equal to or longer than the predetermined length of time, the relogin may not be carried out.

In the above-described embodiment, in the case where there is any login user upon the login command, the account information for the login user is stored, and in the case where the account logged in later has logged out, the user logs in again using the stored account information, but the processing for this relogin may not be executed. That is, the image processing system 900 may be configured such that, in a case where there is a login user upon the login command, account information about the user is not stored, and even when the account logged in later has logged out, the login state of the previous login user is not established again.

In the above-described embodiment, in a case where there is a login user upon the login command, the user logs out to give a higher priority to the account for which the login command is received later, but a higher priority may be given to the login user having logged in first. In this case, if a login processing is executed in a state in which there is the login user, the login fails.

The processes described above may be executed by a single CPU, a plurality of CPUs, hardware such as an application specific integrated circuit (ASIC), or a combination thereof. Also, the processes described above may be achieved in various forms such as a method or a recording medium storing programs for executing the processes.

What is claimed is:

1. A non-transitory storage medium storing a plurality of instructions, the plurality of instructions, when executed by a processor of an information processing device, causing the information processing device to:
   transmit, to an image processing apparatus, a request for receiving account information including an account and a password for a login to a server, the request including identification information for identifying a login requestor;
   after the transmission of the request, receive the account and the password transmitted from the image processing apparatus when the identification information transmitted is registered in the image processing apparatus;
   transmit the account and the password to the server and log in to the server;
   when the log in to the server results in a success, notify the image processing apparatus of the success of the login; and
   after the notification of the success of the login, perform at least one of (i) acquiring image data from the server and transmitting a recording request including the acquired image data and the identification information to the image processing apparatus and (ii) transmitting an image reading request including the identification information to the image processing apparatus, acquiring image data from the image processing apparatus, and transmitting the image data acquired from the image processing apparatus, to the server.

2. The non-transitory storage medium according to claim 1, wherein when executed by the processor, the plurality of instructions causing the information processing device to, when logging in to the server using a certain account information about a certain account different from a specified account as the account received from the image processing apparatus, log out of the server regarding the certain account and log in to the server regarding the specified account using the specified account received from the image processing apparatus.

3. The non-transitory storage medium according to claim 2, wherein when executed by the processor, the plurality of instructions causing the information processing device to:
   store the certain account information when causing logout of the certain account in response to the login of the specified account; and
   when causing logout of the specified account, log in again to the server regarding the certain account using the stored certain account information.

4. The non-transitory storage medium according to claim 1, wherein when executed by the processor, the plurality of instructions causing the information processing device to:
   when a retransmission of the identification information is requested by the image processing apparatus after the notification, sequentially execute transmission of the identification information, reception of the account information, and the login to the server.

5. The non-transitory storage medium according to claim 1, wherein when executed by the processor, the plurality of instructions causing the information processing device to transmit a part of the image data acquired from the server, to the image processing apparatus with the identification information after the success of the login using the account information acquired from the image processing apparatus.

6. An information processing device, comprising:
a communication device configured to communicate with an image processing apparatus and a server; and
a controller configured to: transmit, to an image processing apparatus, a request for receiving account information including an account and a password for a login to a server, the request including identification information for identifying a login requestor;
after the transmission of the request, receive the account and the password transmitted from the image processing apparatus when the identification information transmitted is registered in the image processing apparatus;
transmit the account information and the password to the server and cause the information processing device to log in to the server;
when the log in to the server results in a success, notify the image processing apparatus of the success of the login; and
after notification of success of the login, perform at least one of (i) acquiring image data from the server and transmitting a recording request including the image data and the identification information to the image processing apparatus and (ii) transmitting an image reading request including the identification information to the image processing apparatus, acquiring image data from the image processing apparatus, and transmitting the image data acquired from the image processing apparatus, to the server.

7. The information processing device according to claim 6, wherein the controller is configured to transmit a part of the image data acquired from the server, to the image processing apparatus with the identification information after the success of the login using the account information acquired from the image processing apparatus.

8. An image processing apparatus, comprising:
a communication device configured to communicate with an information processing device;
a storage device configured to store account information including an account and a password, and identification information in association with each other, wherein the account information is used for a login to a server, and the identification information is for identifying a login requestor requesting a login to the server;
an image processing device configured to execute image processing; and
a controller configured to:
when a request for transmitting the account information including the account and the password is received from the information processing device, read the account information associated with the identification information in the request from the storage device and transmit the account information to the information processing device;
store registration information indicating that the information processing device is being logged in to the server in the storage device, in association with the identification information when a login success notification is received, wherein the login success notification is a notification transmitted when the information processing device is logged in to the server using the transmitted account information; and
perform:
determining whether the registration information indicates that the information processing device associated with the identification information attached to a job is being logged in to the server, when the job for causing the image processing device to execute the image processing is received;
executing the job when the registration information indicates that the information processing device associated with the identification information attached to the job is being logged in; and
not executing the job when the registration information indicates that the information processing device associated with the identification information attached to the job is not being logged in.

9. The image processing apparatus according to claim 8, wherein the controller is configured to remove the registration information when the image processing apparatus has not received the job attached with the identification information for a specific period after the registration information is stored in the storage device.

10. The image processing apparatus according to claim 9, wherein the controller is configured to request the information processing device to log in to the server when removing the registration information.

11. An image processing system comprising:
an image processing apparatus; and
an information processing device, the information processing device comprising:
a communication device configured to communicate with the image processing apparatus and a server capable of storing image data; and
a controller configured to:
transmit, to the image processing apparatus, a request for receiving account information including an account and a password for a login to a server, the request including identification information for identifying a login requestor;
after the transmission of the request, receive the account and the password transmitted from the image processing apparatus when the identification information transmitted is registered in the image processing apparatus;
transmit the account and the password to the server and cause the information processing device to log in to the server;
when the log in of the information processing device to the server results in a success, notify the image processing apparatus of the success of the login; and
after the notification of the success of the login, perform at least one of (i) acquiring image data from the server and transmitting the acquired image data and a print request attached with the identification information as a job to the image processing apparatus and (ii) transmitting an image reading request attached with the identification information as a job to the image processing apparatus, acquiring image data from the image processing apparatus, and transmitting the image data acquired from the image processing apparatus, to the server,
wherein the image processing apparatus comprises:
a communication device configured to communicate with the information processing device and the server;
a storage device configured to store account information including an account and a password, and identification information in association with each other, wherein the account information is used for a login to the server, and the identification information is for identifying a login requestor requesting a login to the server;

an image processing device configured to execute an image processing; and a controller configured to:

when a request for transmitting the account information including the account and the password is received from the information processing device, read the account information associated with the identification information included in the request from the storage device and transmit the account information to the information processing device;

store registration information that the information processing device is being logged in to the server in the storage device, in association with the identification information when the notification of the success of login is received from the information processing device; and perform:

determining whether the registration information indicates that the information processing device associated with the identification information attached to a job is being logged in to, when the job for causing the image processing device to execute the image processing is received;

executing the job when the registration information indicates that the information processing device associated with the identification information attached to the job is being logged in; and not executing the job when the registration information indicates that the information processing device associated with the identification information attached to the job is not being logged in.

* * * * *